US005992881A

United States Patent [19]

Faigle

[11] Patent Number: 5,992,881

[45] Date of Patent: Nov. 30, 1999

[54] VEHICLE OCCUPANT PROTECTION APPARATUS WITH MULTIPLE STAGE INFLATOR

[75] Inventor: Ernst M. Faigle, Dryden, Mich.

[73] Assignee: TRW Vehicle Safety Systems Inc., Lyndhurst, Ohio

[21] Appl. No.: 08/886,722

[22] Filed: Jul. 1, 1997

[51] Int. Cl.$^6$ .................... B60R 21/26

[52] U.S. Cl. .................... 280/737; 280/741; 102/531

[58] Field of Search .................... 280/737, 736, 280/741, 742; 137/68.13; 222/3; 102/530, 531

[56] References Cited

U.S. PATENT DOCUMENTS

| | | | |
|---|---|---|---|
| 3,758,131 | 9/1973 | Stephenson et al. | 280/737 |
| 3,961,806 | 6/1976 | Katter | 280/737 |
| 5,348,344 | 9/1994 | Blumenthal et al. | 280/737 |
| 5,470,104 | 11/1995 | Smith et al. | 280/737 |
| 5,494,312 | 2/1996 | Rink | 280/737 |
| 5,582,428 | 12/1996 | Buchanan et al. | 280/741 |
| 5,613,702 | 3/1997 | Goetz | 280/735 |
| 5,683,107 | 11/1997 | Headley et al. | 280/741 |
| 5,690,357 | 11/1997 | Cuevas | 280/737 |
| 5,803,494 | 9/1998 | Headley | 280/737 |

FOREIGN PATENT DOCUMENTS

| | | |
|---|---|---|
| 42-10098 | 5/1942 | Japan . |
| 50-112939 | 9/1975 | Japan . |

OTHER PUBLICATIONS

U.S. Patent Appln. Serial No. 08/760,837, filed Dec. 5, 1996 entitled Vehicle Occupant Protection Apparatus.

U.S. Patent Appln. Serial No. 08/816,982, filed Mar. 11, 1997, entitled Vehicle Occupant Protection Apparatus.

U.S. Patent Appln. Serial No. 08/848,074, filed May 1, 1997, entitled Vehicle Occupant Protection Apparatus.

*Primary Examiner*—Peter C. English

*Attorney, Agent, or Firm*—Tarolli, Sundheim, Covell, Tummino & Szabo LLP

[57] ABSTRACT

An apparatus (10) comprises a pressure vessel (16) and an initiator assembly (18). The pressure vessel (16) defines first and second chambers (20, 22). A first combustible mixture in the first chamber (20) includes fuel gas at a first volume percentage. A second combustible mixture of gases in the second chamber (22) includes fuel gas at a second, greater volume percentage. The initiator assembly (18) includes a first igniter (26) which is actuatable to ignite the first combustible mixture. The initiator assembly (18) further includes a second igniter (28) which is actuatable to ignite the second combustible mixture. A controller (30) actuates the initiator assembly (18) in a selected one of a plurality of differing stages corresponding to a plurality of differing conditions. The differing stages of actuation include a stage in which the first igniter (26) is actuated and the second igniter (28) is not actuated.

15 Claims, 2 Drawing Sheets

VEHICLE OCCUPANT PROTECTION APPARATUS WITH MULTIPLE STAGE INFLATOR

FIELD OF THE INVENTION

The present invention relates to an apparatus for deploying an inflatable vehicle occupant protection device.

BACKGROUND OF THE INVENTION

An inflatable vehicle occupant protection device, such as an air bag, is deployed upon the occurrence of a vehicle crash. The air bag is part of a vehicle occupant protection apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is deployed in this manner, it helps to protect an occupant of the vehicle from a forceful impact with parts of the vehicle as a result of the crash.

A particular type of air bag inflator contains inflation fluid under pressure. Such an inflator is disclosed in U.S. Pat. No. 5,348,344. In the inflator disclosed in the '344 patent, the inflation fluid is an ingredient in a mixture of gases. The mixture of gases further includes a fuel gas which, when ignited, heats the inflation fluid.

The inflator has an igniter containing a small charge of pyrotechnic material. When the air bag is to be inflated, the igniter is actuated electrically. The pyrotechnic material is then ignited and produces combustion products which ignite the fuel gas. The fluid pressure inside the inflator is increased by the heat generated upon combustion of the fuel gas. The inflation fluid then flows outward from the inflator and into the air bag to inflate the air bag more quickly than if the inflation fluid had not been heated and further pressurized.

The manner in which the inflating air bag affects movement of the vehicle occupant can be influenced by factors such as the force with which the occupant moves against the air bag and the pressure of the inflation fluid in the air bag. Those factors, in turn, can be influenced by vehicle conditions, such as the severity of the crash, and/or by vehicle occupant conditions, such as the size, weight and position of the occupant.

SUMMARY OF THE INVENTION

In accordance with the present invention, an apparatus comprises a pressure vessel and an initiator assembly. The pressure vessel defines first and second chambers. A first combustible mixture of gases in the first chamber includes fuel gas at a first volume percentage. A second combustible mixture of gases in the second chamber includes fuel gas at a second, greater volume percentage.

The initiator assembly includes a first igniter which is actuatable to ignite the first combustible mixture of gases. The initiator assembly further includes a second igniter which is actuatable to ignite the second combustible mixture of gases. An actuating means actuates the initiator assembly in a selected one of a plurality of differing stages corresponding to a plurality of differing conditions. The differing stages of actuation include a stage in which the first igniter is actuated and the second igniter is not actuated.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
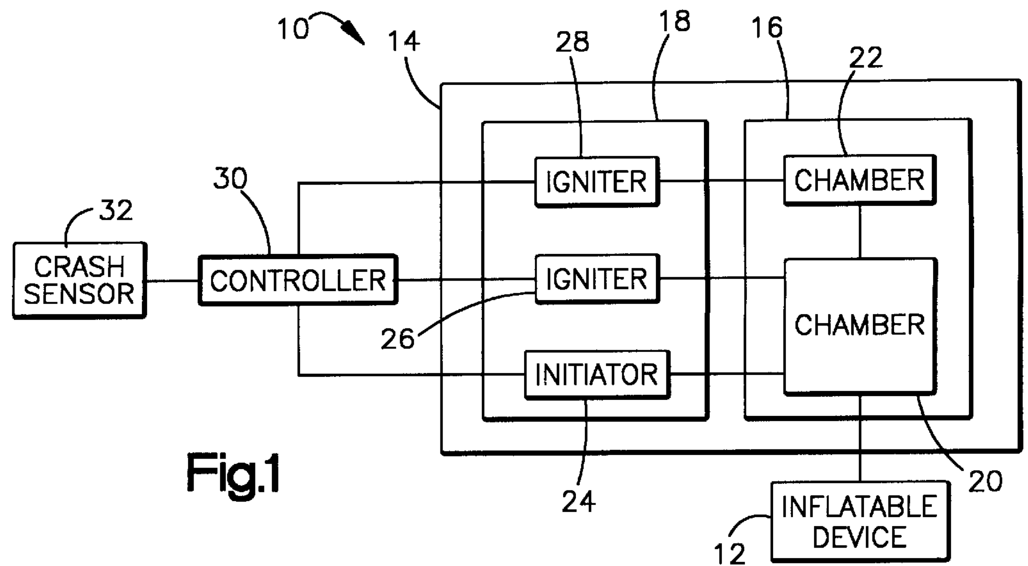
FIG. 1 is a schematic view of a vehicle occupant protection apparatus comprising a first embodiment of the invention.

A vehicle occupant protection apparatus 10 comprising a first embodiment of the present invention is shown schematically in FIG. 1. The apparatus 10 includes an inflatable vehicle occupant protection device 12. In the first embodiment of the invention, the protection device 12 is an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. The apparatus 10 further includes an inflator 14 which comprises a source of inflation fluid for inflating the air bag 12. When the air bag 12 is inflated, it extends into a vehicle occupant compartment (not shown) to help protect a vehicle occupant from a forceful impact with parts of the vehicle as a result of a crash.

The inflator 14 includes a pressure vessel 16 which stores pressurized inflation fluid for inflating the air bag 12. The inflator 14 further includes an initiator assembly 18 which, when actuated, causes the inflation fluid to flow from the pressure vessel 16 to the air bag 12. More specifically, the pressure vessel 16 defines first and second fluid storage chambers 20 and 22. Each of the storage chambers 20 and 22 contains a combustible mixture of gases. The initiator assembly 18 includes an initiator 24, a first igniter 26, and a second igniter 28. A controller 30 actuates the initiator assembly 18 in response to a deployment signal received from a crash sensor 32.

The combustible mixture of gases stored in the first chamber 20 includes primary gas and fuel gas. The fuel gas provides heat of combustion which heats the primary gas. This mixture of gases may have any suitable composition known in the art, but preferably has a composition in accordance with the invention set forth in U.S. Pat. No. 5,348,344, noted above. Accordingly, the primary gas preferably includes inert gas for inflating the air bag 12 and oxidizer gas for supporting combustion of the fuel gas. The inert gas preferably comprises the majority of the inflation fluid that is stored in the pressure vessel 16 for inflation of the air bag 12, and may be nitrogen, argon or a mixture of nitrogen and argon. For example, the primary gas may be air, with the oxidizer gas being the oxygen in the air. The fuel gas may be hydrogen, methane, or a mixture of hydrogen and methane. Preferably, the fuel gas is hydrogen. A preferred composition of the mixture of gases is about 13% by volume hydrogen and about 87% by volume air. Although the storage pressure in the first chamber 20 may vary, it is preferably within the range of about 1,500 psig to about 5,000 psig, and is most preferably about 3,000 psig.

The combustible mixture of gases stored in the second chamber 22 preferably consists essentially of fuel gas and oxidizer gas which supports combustion of the fuel gas. The fuel gas in the second chamber 22 also may be hydrogen, methane, or a mixture of hydrogen and methane. The oxidizer gas is preferably oxygen. A preferred composition for such a mixture is about 20% by volume hydrogen and about 80% by volume oxygen, and a preferred storage pressure is within the range of about 400 psig to about 500 psig. Alternatively, the mixture of gases stored in the second chamber 22 could include inert gas, and could have a higher storage pressure, as described above with reference to the mixture stored in the first chamber 20. However, in each case, the volume percentage of fuel gas in the mixture stored in the second chamber 22 is preferably greater than the volume percentage of fuel gas in the mixture stored in the first chamber 20.

The crash sensor 32 is a known device which senses a vehicle condition that indicates the occurrence of a crash. If the vehicle condition sensed by the crash sensor 32 is at or above a predetermined threshold level, it indicates the occurrence of a crash having at least a predetermined threshold level of severity. The threshold level of crash severity is a level at which inflation of the air bag 12 is desired for protection of a vehicle occupant. The crash sensor 32 then provides the controller 30 with a deployment signal.

The vehicle condition sensed by the crash sensor 32 preferably comprises sudden vehicle deceleration that is caused by a collision. The magnitude and duration of the deceleration are measured by the crash sensor 32. If the magnitude and duration of the deceleration meet or exceed predetermined threshold levels, they indicate the occurrence of a crash that meets or exceeds the predetermined threshold level of crash severity. The deployment signal is then transmitted to the controller 30 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 12 is to be inflated.

The controller 30, which may comprise a known microprocessor, actuates the initiator 24 upon receiving the deployment signal from the crash sensor 32. The controller 30 actuates the first and second igniters 26 and 28 at times that are determined with reference to the value of the deployment signal received from the crash sensor 32. Actuation of the initiator assembly 18 is thus timed with reference to both the occurrence and the severity of the crash. As described fully below, this causes inflation fluid to flow from the pressure vessel 16 to the air bag 12 at flow rates that are correlated to the severity of the crash so that the air bag 12 is deployed accordingly.

Figure 2:
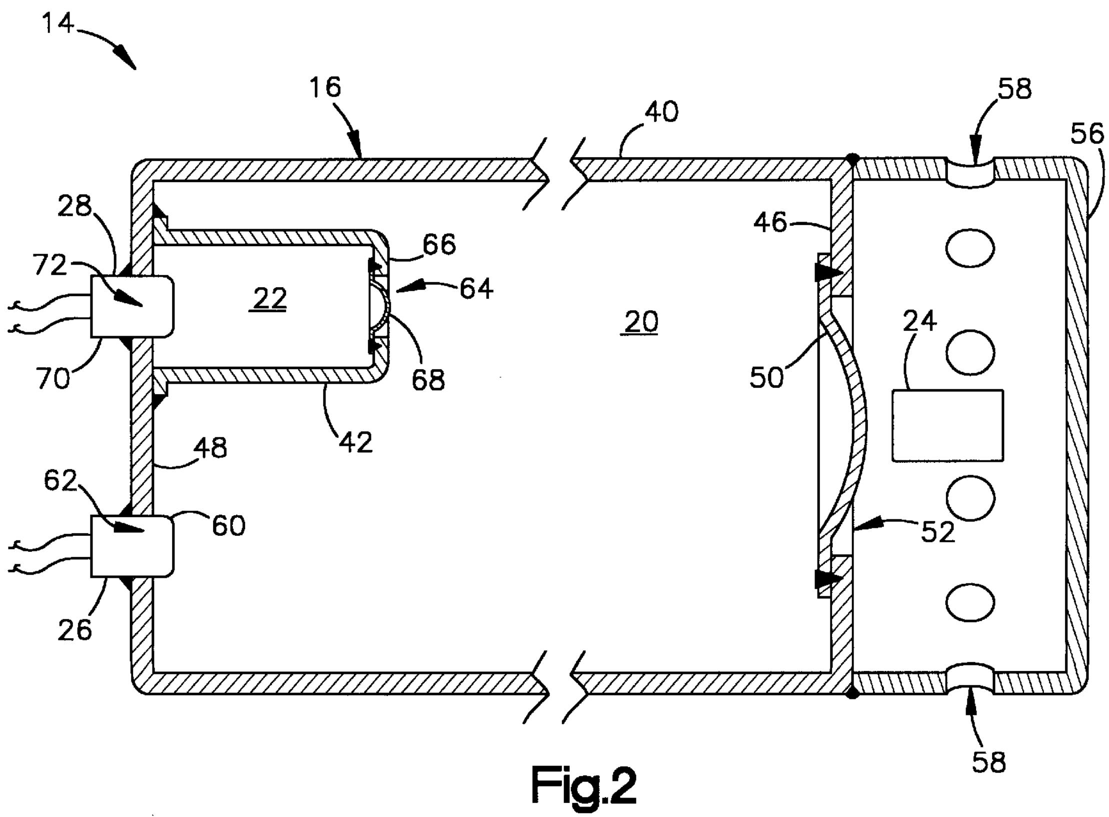
FIG. 2 is a side view, partly in section, of parts of the apparatus of FIG. 1.

The inflator 14 in the preferred embodiments of the present invention has the structure shown by way of example in FIG. 2. The pressure vessel 16 includes an outer tank 40 defining the first storage chamber 20, and further includes an inner tank 42 defining the second storage chamber 22.

The outer tank 40 is a cylindrical part with a pair of opposite end walls 46 and 48. A rupturable closure wall 50, which preferably comprises a burst disk of known construction, closes an outlet opening 52 in an end wall 46 of the tank 40. The initiator 24 (shown schematically) may comprise any suitable initiating device known in the art. When the initiator 24 is actuated, it ruptures the burst disk 50 to open the first chamber 20. The inflation fluid then begins to flow through the outlet opening 52. A diffuser 56 directs the inflation fluid to flow from the outlet opening 52 to a plurality of diffuser openings 58, and further outward from the inflator 14 through the diffuser openings 58.

The first igniter 26 is a particular type of electrically actuatable device which is known as a squib. The first igniter 26 thus has a cylindrical casing 60 containing a small charge of pyrotechnic material. The casing 60 extends closely through an aperture 62 in the end wall 48 of the outer tank 40 opposite the outlet opening 52, and projects from the end wall 48 into the first chamber 20. When the first igniter 26 is actuated, the pyrotechnic material is ignited and produces combustion products including heat and hot particles. The combustion products are spewed from the casing 60 into the first chamber 20 to ignite the mixture of gases stored in the first chamber 20. The heat generated by combustion of the fuel gas causes the fluid pressure in the first chamber 20 to increase rapidly to elevated levels that are substantially greater than the storage pressure. The increased pressure levels cause corresponding increases in the flow rate at which the inflation fluid emerges from the outlet opening 52.

The inner tank 42 also is a cylindrical part, and projects from the end wall 48 of the outer tank 40. An outlet opening 64 extends through an end wall 66 of the inner tank 42. A rupturable closure wall in the form of a smaller burst disk 68 closes the outlet opening 64. The second igniter 28, which also is a squib with a cylindrical casing 70, extends closely through an aperture 72 in the end wall 48 of the outer tank 40, and projects into the second chamber 22.

When the second igniter 28 is actuated, it spews combustion products into the second chamber 22 to ignite the fuel gas in the second chamber 22. This causes the temperature and pressure of the mixture of gases stored in the second chamber 22 to increase to elevated levels which cause the burst disk 68 to rupture. The heated and further pressurized gases then flow rapidly outward from the second chamber 22 to the first chamber 20 through the outlet opening 64. In this manner, the mixture of gases stored in the second chamber 22 is used as a source of additional energy for heating and further pressurizing the mixture of gases stored in the first chamber 20.

As noted above, the controller 30 actuates the initiator 24 upon receiving the deployment signal from the crash sensor 32. The controller 30 then actuates the first and second igniters 26 and 28 in a selected one of a plurality of differing stages in response to the crash severity indicated by the deployment signal. The differing stages of actuation include a stage in which the first igniter 26 is actuated, with the second igniter 28 not being actuated. The differing stages of actuation also include stages in which both of the igniters 26 and 28 are actuated, either simultaneously or sequentially.

For example, if the deployment signal indicates that the vehicle is experiencing a crash of a low severity, the controller 30 may select a stage in which the first igniter 26 is actuated after the lapse of a delay time following actuation of the initiator 24. The delay time provides a corresponding amount of "soft" inflation of the air bag 12 before the outlet flow rate from the inflator 14 is increased by actuation of the first igniter 26. The controller 30 may determine the delay time by selecting from a look-up table based on empirically derived values of crash severity. The controller 30 may alternatively determine the delay time as a result of a computation based on a predetermined functional relationship between crash severity and delay time. In any case, the delay time will affect the amount of fuel gas remaining in the first chamber 20 when the first igniter 26 is actuated, and will thus affect the increased pressure levels and outlet flow rates attained upon actuation of the first igniter 26.

If the deployment signal indicates that the vehicle is experiencing a crash of an intermediate level of severity, the controller 30 may select a stage in which the initiator 24 and the first igniter 26 are actuated simultaneously, i.e., with a delay time of zero. This stage of actuation will cause the fluid pressure in the first chamber 20 to reach elevated levels more rapidly. If a greater level of crash severity requires the fluid pressure to reach elevated levels even more rapidly, the controller 30 may select a stage in which the second igniter 28 also is actuated. This would provide additional energy for heating and pressurizing the inflation fluid in the first chamber 20, as described above. The second igniter 28 could be actuated either with or without another delay time following actuation of the first igniter 26.

Figure 3:
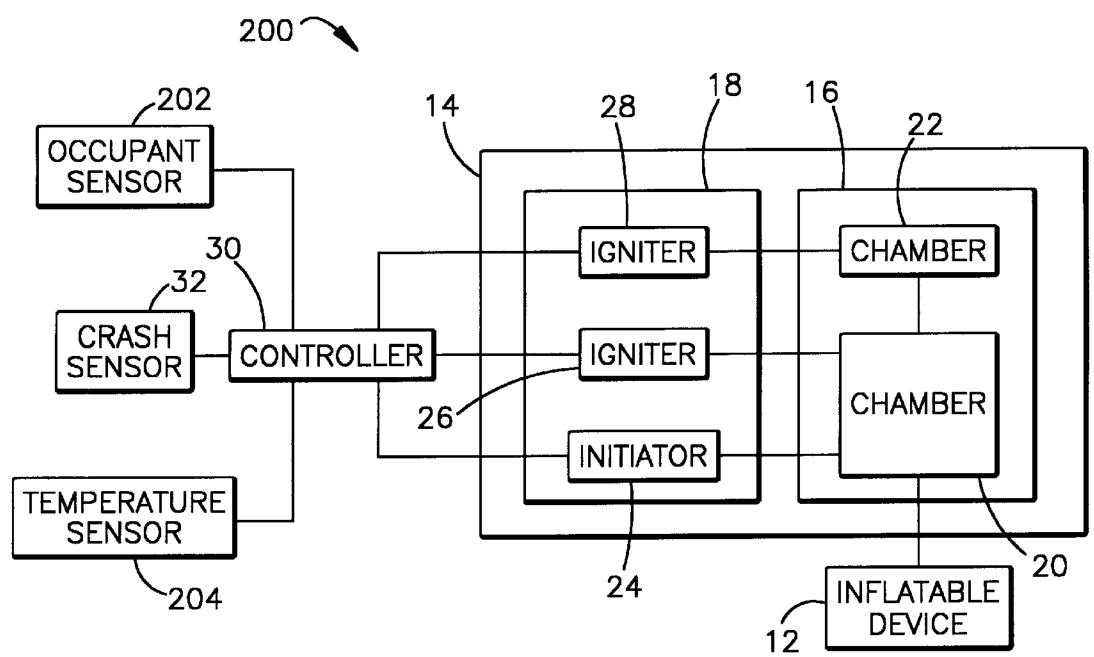
FIG. 3 is a schematic view of a vehicle occupant protection apparatus comprising a second embodiment of the invention.

A vehicle occupant protection apparatus 200 comprising a second embodiment of the present invention is shown schematically in FIG. 3. The apparatus 200 includes an occupant condition sensor 202 and a temperature sensor 204 in addition to the crash sensor 32 of FIG. 1. The apparatus 200 is otherwise the same as the apparatus 10, as indicated by the use of the same reference numbers in FIGS. 3 and 1.

The occupant condition sensor 202 may comprise any known device that provides a signal indicating a vehicle occupant condition such as, for example, an occupant's size, weight and/or position. Other vehicle occupant conditions include the occupant's presence in the vehicle and the occupant's use of a seat belt, as indicated by a seat belt buckle switch or the like. In each case, the sensor 202 provides the controller 30 with an additional deployment signal that the controller 30 uses, along with the deployment signal received from the crash sensor 32, to select a stage of actuation for the initiator assembly 18.

The temperature sensor 204 provides a deployment signal indicating the ambient temperature at the inflator 14. Since the ambient temperature at the inflator 14 can affect the pressure of the inflation fluid stored in the pressure vessel 16, it can affect the flow rate at which the inflation fluid exits the pressure vessel 16 upon actuation of the initiator assembly 18. The controller 30 in the second embodiment may thus select a stage of actuation for the initiator assembly 18 with reference to the occurrence and severity of a vehicle crash, and with further reference to a condition of a vehicle occupant and/or the ambient temperature at the inflator 14.

From the above description of the invention, those skilled in the art will perceive improvements, changes and modifications. For example, the deployment conditions sensed by the sensors 32, 202 and 204 are described by way of example only. Other vehicle or vehicle occupant conditions also could be used as deployment conditions for selecting an actuation stage for an initiator assembly in accordance with the present invention. Such improvements, changes and modifications within the skill of the art are intended to be covered by the appended claims.

Having described the invention, the following is claimed:

1. Apparatus comprising:

a pressure vessel defining first and second chambers;

a first combustible mixture of gases in said first chamber, said first combustible mixture including a fuel gas at a first volume percentage;

a second combustible mixture of gases in said second chamber, said second combustible mixture including a fuel gas at a second, greater volume percentage;

an initiator assembly including a first igniter which is actuatable to ignite said first combustible mixture and a second igniter which is actuatable to ignite said second combustible mixture; and means for actuating said initiator assembly in a selected one of a plurality of differing stages corresponding to a plurality of differing conditions, said differing stages including a stage in which said first igniter is actuated and said second igniter is not actuated.

2. Apparatus as defined in claim 1 wherein said first combustible mixture of gases includes inert gas which comprises the majority of gas stored in said pressure vessel, said second combustible mixture of gases consisting essentially of fuel gas and oxidizer gas.

3. Apparatus as defined in claim 2 wherein said first combustible mixture of gases is stored in said first chamber at a pressure of about 1,500 psig to about 5,000 psig, said second combustible mixture of gases being stored in said second chamber at a pressure of about 400 psig to about 500 psig.

4. Apparatus comprising:

a pressure vessel defining first and second chambers, a first rupturable closure wall separating said first chamber from the exterior of said pressure vessel, and a second rupturable closure wall separating said chambers from each other;

a first combustible mixture of gases in said first chamber, said first combustible mixture including a fuel gas at a first volume percentage;

a second combustible mixture of gases in said second chamber, said second combustible mixture including a fuel gas at a second, greater volume percentage; and an initiator assembly which is actuatable to ignite said first and second combustible mixtures.

5. Apparatus as defined in claim 4 wherein said first combustible mixture of gases includes inert gas which comprises the majority of gas in said pressure vessel, said second combustible mixture of gases consisting essentially of fuel gas and oxidizer gas.

6. Apparatus as defined in claim 5 wherein said first combustible mixture of gases is stored in said first chamber at a pressure of about 1,500 psig to about 5,000 psig, said second combustible mixture of gases being stored in said second chamber at a pressure of about 400 psig to about 500 psig.

7. Apparatus as defined in claim 4 wherein said initiator assembly includes a first igniter which is actuatable to ignite said first combustible mixture of gases and a second igniter which is actuatable to ignite said second combustible mixture of gases, said apparatus further comprising means for actuating said initiator assembly in a selected one of a plurality of differing stages corresponding to a plurality of differing conditions, said differing stages including a stage in which said first igniter is actuated and said second igniter is not actuated.

8. Apparatus as defined in claim 7 wherein said initiator assembly further includes an initiator which is actuatable to rupture said first rupturable closure wall without igniting said first combustible mixture of gases.

9. Apparatus as defined in claim 4 wherein said first combustible mixture of gases fills said first chamber and said second combustible mixture of gases fills said second chamber.

10. Apparatus comprising:

a pressure vessel defining first and second chambers, a first rupturable closure wall separating said first chamber from the exterior of said pressure vessel, and a second rupturable closure wall separating said chambers from each other;

a first combustible mixture of gases in said first chamber;

a second combustible mixture of gases in said second chamber;

an initiator assembly including a first igniter which is actuatable to ignite said first combustible mixture of gases and a second igniter which is actuatable to ignite said second combustible mixture of gases; and means for actuating said initiator assembly in a selected one of a plurality of differing stages corresponding to a plurality of differing conditions, said differing stages including a stage in which said first igniter is actuated and said second igniter is not actuated;

said first combustible mixture of gases including a fuel gas at a first volume percentage, said second combustible mixture of gases including a fuel gas at a second, greater volume percentage.

11. Apparatus as defined in claim 10 wherein said first combustible mixture of gases further includes inert gas which comprises the majority of gas in said pressure vessel, said second combustible mixture of gases consisting essentially of fuel gas and oxidizer gas.

12. Apparatus as defined in claim 11 wherein said first combustible mixture of gases is stored in said first chamber at a pressure of about 1,500 psig to about 5,000 psig, said second combustible mixture of gases being stored in said second chamber at a pressure of about 400 psig to about 500 psig.

13. Apparatus comprising:

a pressure vessel defining first and second chambers, a first rupturable closure wall separating said first chamber from the exterior of said pressure vessel, and a second rupturable closure wall separating said chambers from each other;

a first combustible mixture of gases filling said first chamber;

a second combustible mixture of gases filling said second chamber;

an initiator assembly including a first igniter which is actuatable to ignite said first combustible mixture of gases and a second igniter which is actuatable to ignite said second combustible mixture of gases; and means for actuating said initiator assembly in a selected one of a plurality of differing stages corresponding to a plurality of differing conditions, said differing stages including a stage in which said first igniter is actuated and said second igniter is not actuated, wherein said first combustible mixture of gases includes a fuel gas at a first volume percentage, said second combustible mixture of gases including a fuel gas at a second, greater volume percentage.

14. Apparatus as defined in claim 13 wherein said first combustible mixture of gases further includes inert gas which comprises the majority of gas in said pressure vessel, said second combustible mixture of gases consisting essentially of fuel gas and oxidizer gas.

15. Apparatus as defined in claim 14 wherein said first combustible mixture of gases is stored in said first chamber at a pressure of about 1,500 psig to about 5,000 psig, said second combustible mixture of gases being stored in said second chamber at a pressure of about 400 psig to about 500 psig.

* * * * *